Figure 1:
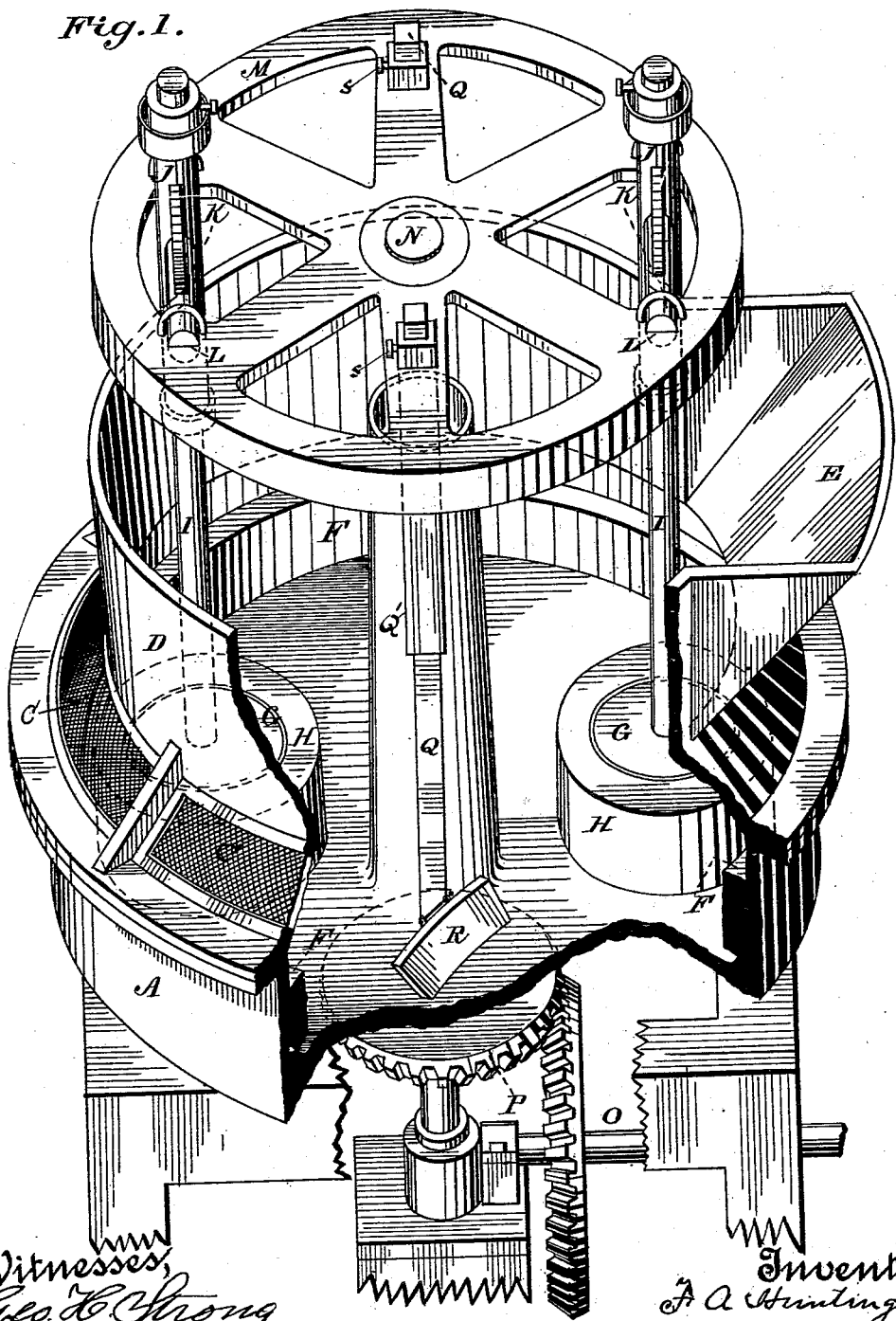

(No Model.)

F. A. HUNTINGTON.
CRUSHING MILL.

No. 277,134. Patented May 8, 1883.

Witnesses
Geo. H. Strong
J. H. Rouse

Inventor
F. A. Huntington
By Dewey & Co.
Attorney (No Model.) 2 Sheets—Sheet 2.
F. A. HUNTINGTON.
CRUSHING MILL.
No. 277,134. Patented May 8, 1883.
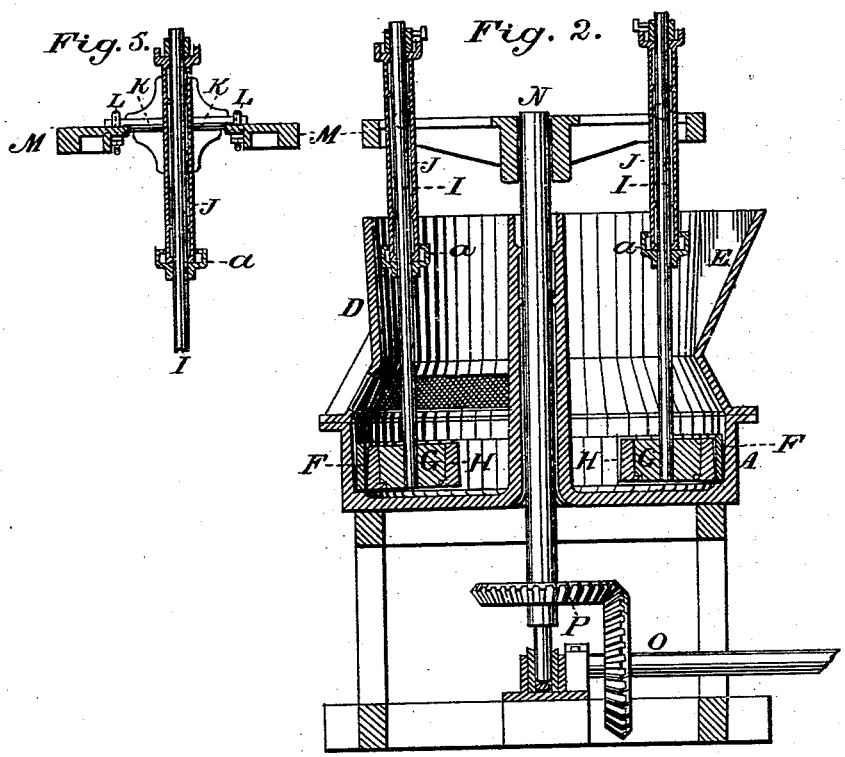
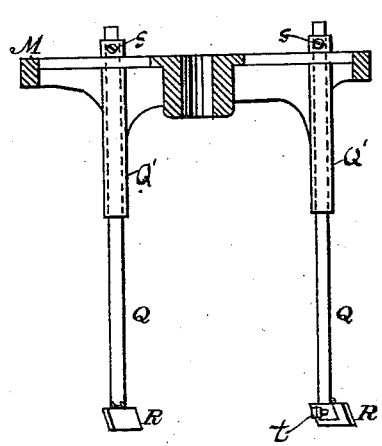
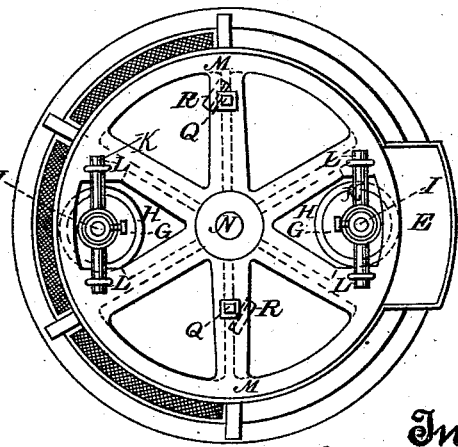
Witnesses
Geo. H. Strong
J. H. Krouse
Inventor
F. A. Huntington
by Dewey & Co.
Attorneys

UNITED STATES PATENT OFFICE.

FRANK A. HUNTINGTON, OF SAN FRANCISCO, CALIFORNIA.

CRUSHING-MILL.

SPECIFICATION forming part of Letters Patent No. 277,134, dated May 8, 1883.

Application filed October 2, 1882. (No model.)

*To all whom it may concern:*

Be it known that I, FRANK A. HUNTINGTON, of the city and county of San Francisco, State of California, have invented an Improved Crushing-Mill; and I hereby declare the following to be a full, clear, and exact description thereof.

My invention relates to a crushing-mill which is more especially intended for the crushing of quartz and valuable metal-bearing rock.

It consists of a pan having an interior circular die around its periphery, and, in combination with this, of a series of rollers which roll against this die, being suspended by vertical shafts turning in sleeves which have horizontal journals above, so that the rollers may swing radially. The suspending mechanism is supported upon a cross or frame which is driven by a central shaft, and the rollers are thus thrown outward against the die by centrifugal action. In connection with this apparatus I employ scrapers which are carried around by the frame and throw the material to the outside, where it will be acted upon by the crushing-rollers until it is fine enough to pass through the screens in the sides of the pan above the crushers.

Referring to the accompanying drawings for a more complete explanation of my invention, Figure 1 is a perspective view of my apparatus with a portion of the pan broken away to show the interior. Fig. 2 is a vertical section through the center. Fig. 3 is a plan view. Figs. 4 and 5 are detail sections.

A is the pan, having sides which are vertical for a short distance from the bottom. They are then inclined inward for a short distance at B, and have discharging-screens C fixed in them at intervals around the pan. Above this inclined portion the sides may extend vertically again, as shown at D, and a spout or hopper, E, serves to supply the material to be crushed. Around the interior of the part A of the pan is a die or annular plate, F, which protects the pan itself, and upon which the rock is crushed. The die must be made in a single piece to resist the strain upon it, and is preferably made of wrought-iron.

G G are rollers having cylindrical shoes H surrounding them, which may be replaced at any time when worn out. These shoes may be made of cast-iron; but the large interior die of the pan should be of wrought-iron, because it will wear smoother and not become chipped, broken, and uneven by the crushing action against it. The rollers G have vertical stems or shafts I, to which they are fixed centrally; and the shafts extend up into or through sleeves J, in which they are fitted to turn.
Drip-cups *a* fit closely around the shafts beneath the sleeves to catch any oil and keep it out of the pan. These sleeves have horizontal trunnions K, which turn in boxes L upon a circular or other suitable frame, M, which is keyed to a central shaft, N. This shaft passes down through the pan and is actuated through the shaft O and bevel-gears P, so as to cause the frame M to rotate and carry with it the shafts I and their attached rollers G. It will be manifest that the vertical shafts carrying the rollers may be suspended in various ways, so as to allow the rollers to move to and from the center, which is the important feature of my invention. By reason of the horizontally-journaled sleeves J, through which the shafts I pass, the latter, with their suspended rollers G, are allowed to swing to or from the center of the pan, and when the frame M is rapidly rotated the rollers will be thrown outward by centrifugal force, so as to crush anything which may pass between them and the die surrounding the inside of the pan. In the present case I have shown two rollers supported from opposite arms of the frame, while the other two of the arms have adjustable standards Q projecting downward from them and carrying the scrapers or stirrers R, which are secured to their lower ends. The stirrers R are angular or curved plates hinged to the lower ends of rods Q, and may be adjusted at any angle by means of set-screws *t*, through the lower extremities of said rods. The scrapers have a vertical adjustment with relation to the bottom of the pan by means of the rods Q, sliding through sleeves Q' in the frame, and held at any desired elevation by set-screws *s s*. One of the scrapers is set well out toward the circumference of the pan, and the other is set nearer the center, as shown in Figs. 3 and 4.

By the employment of the sleeves J and the shafts I, fixed in the rollers, it will be seen that there is no wear of the shaft-journals, as they are too high above the material in the pan to be touched by it.

The scrapers R serve to lift the material from the bottom of the pan, as the rollers do not touch the bottom of the pan, so that it will be carried between the rollers and the die until sufficiently fine to pass through the screens.

Having thus described my invention, what I claim as new, and desire to secure by Letters Patent, is—

1. The pan A, having the interior vertical circular die, F, in combination with the rollers G, shafts I, and means for suspending said shafts from above, so that said rollers may rotate against the die by centrifugal force, substantially as herein described.

2. The pan A, having the interior vertical die, F, the rollers G, and shafts I, in combination with the sleeves J, horizontal trunnions K, boxes L, and the rotating frame M, substantially as herein described.

3. The pan A, having die F, the rotary suspended crushing-rollers G, and actuating-frame, in combination with the scrapers or stirrers R, vertically adjustable within the pan, substantially as herein described.

In witness whereof I hereunto set my hand.

FRANK A. HUNTINGTON.

Witnesses:
  H. BUD,
  J. H. BLOOD.